May 19, 1936.  P. KOLLSMAN  2,041,072
MAGNETIC COMPASS
Filed July 22, 1933    2 Sheets-Sheet 1

INVENTOR
Paul Kollsman
BY
ATTORNEY

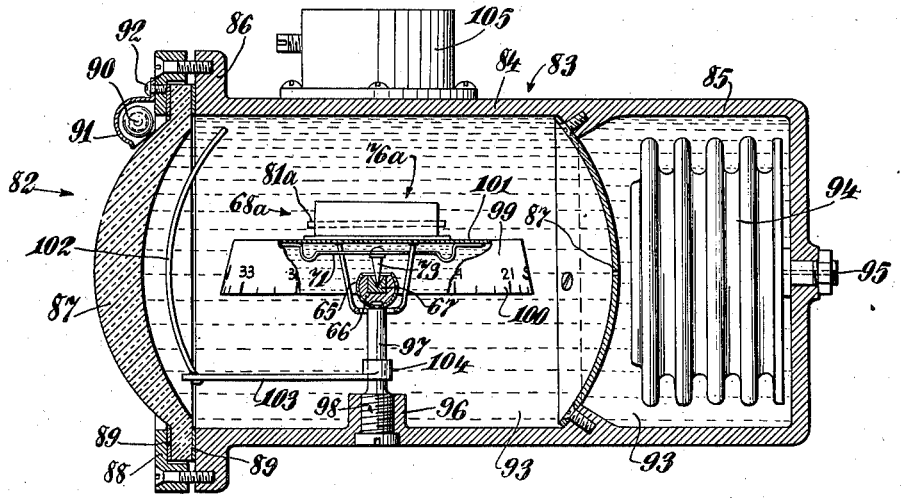

Patented May 19, 1936

2,041,072

UNITED STATES PATENT OFFICE 2,041,072

MAGNETIC COMPASS

Paul Kollsman, New York, N. Y.

Application July 22, 1933, Serial No. 681,673

12 Claims. (Cl. 33—223)

This invention relates to indicating devices such as magnetic compasses.

One object of the invention is to provide a device of the character described having an improved coordination of parts and/or means for supporting a liquid damped indicating element in such a manner as to uniformly reduce or eliminate vibrations thereof in course of normal use thereof, relative to the liquid.

In one device of this kind the vibrations of the indicating element which are caused when the device is used, for example, in course of normal horizontal flight of an aircraft, increase with certain variations in temperature, due to changes in density of the damping liquid, with the result that a variable deviation in the operation or reading of the device occurs. Heretofore, in highly sensitive devices of this character wherein the damping liquid is fully enclosed, I have provided a thermostatic control as shown in my copending application, Serial No. 603,432, filed April 5, 1932, for the purpose of maintaining a substantially uniform temperature, and hence to avoid undue expansion of the liquid, bearing in mind that the coefficient of thermal expansion of the float is so small that it may for most purposes be disregarded. With the present invention, the thermostatic control can be eliminated by utilizing an improved coordination of parts in respect to buoyancy, which coordination will be amply sufficient for many purposes in operation, so as not to permit a variation in density of the liquid to affect the damping action thereof on the indicating element in any substantial degree. More fundamentally, the invention provides a movable element whose density approaches that of the liquid so as to reduce the bearing pressure of the element, and to cause the latter to substantially follow the oscillations of the liquid and hence to be damped relatively thereto and the compass bowl, so that deviations in the readings of the element caused by said oscillations are reduced.

Another object of the invention is to furnish a magnetic compass wherein the enclosed damping liquid is so maintained that air or other gases which may be in the liquid will not be evolved to form a bubble upon a decrease in temperature and consequent reduction in volume of the liquid, even though the temperature be reduced to a point substantially below that at which the compass was assembled and the liquid enclosed.

Another object of the invention is to provide a magnetic compass having improved means for directly diminishing vibrations created by an aircraft and normally transmitted to the compass bowl and thence to the indicator through the mounting thereof.

A further object of the invention is to provide a device of the nature set forth having relatively few and simple parts, and which is inexpensive to manufacture, neat and compact, convenient and expeditious in use, durable, reliable, and efficient to a high degree, and adapted for accurate operation under a large range of varying conditions.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawings, wherein like parts are designated by the same reference characters throughout the several views.

In the drawings:

Fig. 3 is a view in vertical section taken on line 3—3 of Fig. 2, showing a modification of the invention.

Fig. 4 is a top plan view thereof with a part removed.

Figure 1:
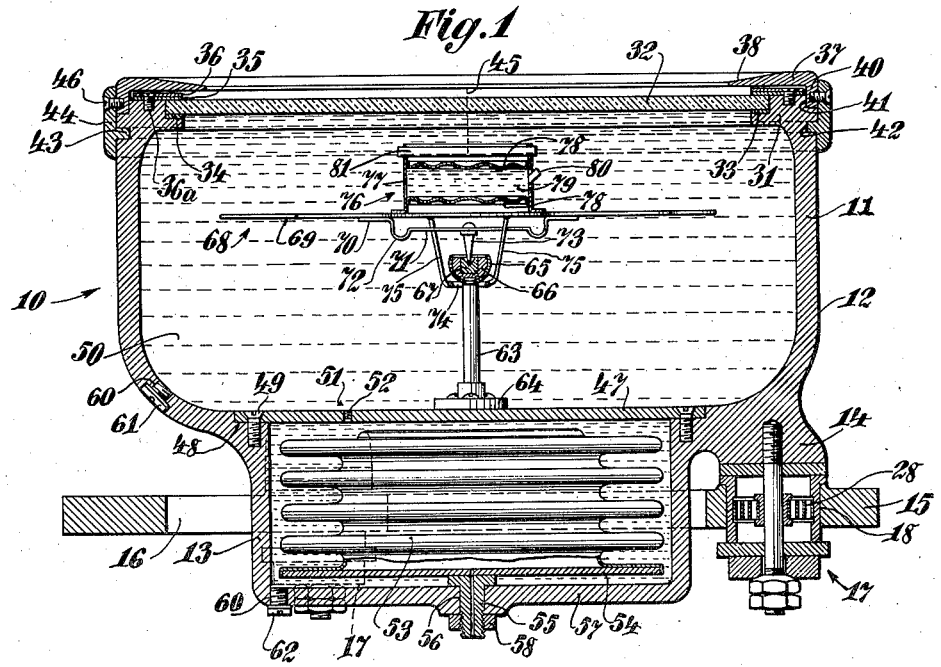
Figure 1 is a view in vertical section taken on line 1—1 of Fig. 2, showing a device embodying the invention.
Figure 2:
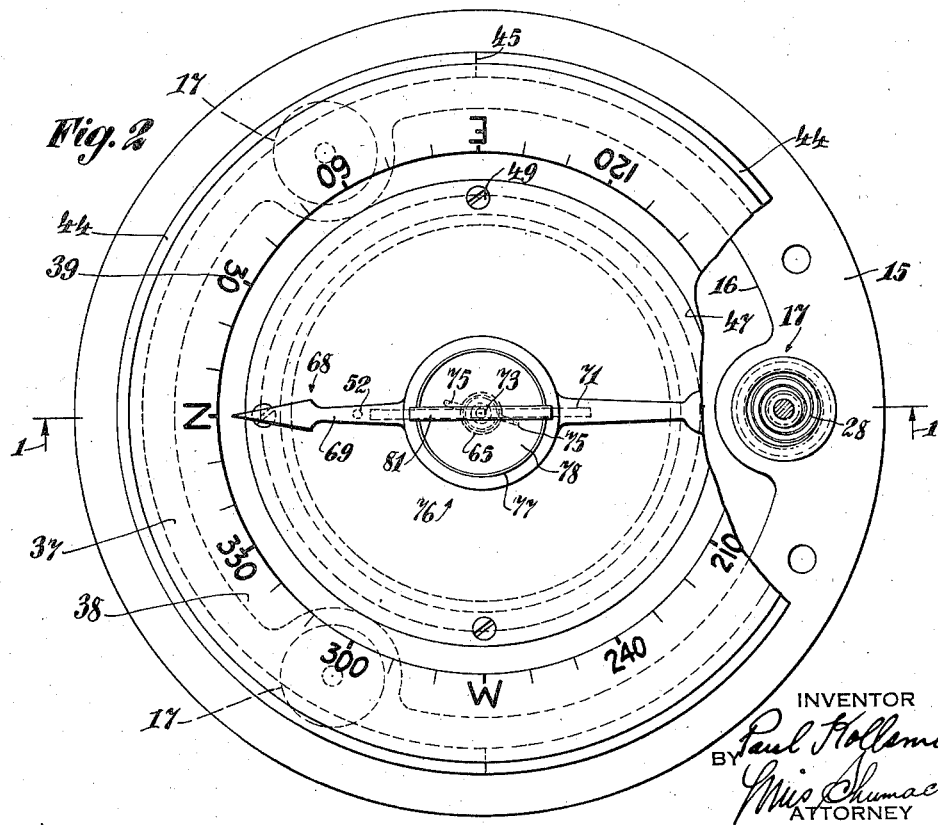
Fig. 2 is a top plan view thereof with parts removed.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawings, therefore, are submitted merely as showing the preferred exemplification of the invention.

Referring in detail to the drawings, 10 denotes a device embodying the invention, and which may be in the nature of a magnetic compass for conveniently illustrating the advantages of the invention. The same may include a casing having a bowl 12 of generally cylindrical shape, and a lower expansion chamber 13 which may likewise be of substantially cylindrical shape and coaxial with the bowl 12, but of smaller diameter than the latter.

A support 15 for the bowl may have an opening 16 to receive the same. Conventional shock absorbers 17 having spiral springs 28 may be mounted on the support as in openings 18 radially spaced from the opening 16 and alined with the lugs 14 of the bowl to which the shock absorbers are secured for cushioning the bowl along a horizontal plane.

The bowl 12 has along the rim thereof an annular flange or enlargement 31 affording a horizontal opening. For closing the latter, preferably hermetically, a glass 32 may be set into a rabbet 33 in said flange, and backed on opposite sides by suitable packing rings 34, 35, and secured tight as by an overlying metallic ring 36 affixed to said flange as by screws 36a.

Movably mounted on the bowl for external manipulation, is an indicator such as a compass card arranged preferably in the form of an annular metallic ring 37, coaxial with the bowl. Said ring 37 may have a beveled upper face 38 provided with indicia 39 indicative of degrees or the like. One manner of annularly mounting the compass ring is to provide the same with an annular downward extending flange 40 rotatably seated in corresponding external annular recess 41 of the flange 31. For securing the compass ring to the casing 11, the latter or the flange 31 may have an annular groove 42 for receiving a corresponding lip 43 of a ring 44 that may be vertically diametrically split at 45, the sections of the ring 44 engaging around and being secured to the flange 40 of the compass ring as by screws 46. In this manner the compass ring may be readily secured to the casing, is reliably retained, and may be easily rotated, and set as by frictional engagement at 42, 43, that may be adjusted by the screws 46.

Separating the bowl 12 and expansion chamber 13 is a horizontal wall or disc 47 set into a rabbet seat 48 and secured as by screws 49. The bowl and chamber are filled with a liquid 50, and to permit the passage of said liquid from the bowl into the expansion chamber and vice versa, capillary means 51 is provided in the plate 47, which means may consist of an opening filled with a suitable porous or other capillary material 52 such as cotton, steel wool, porous cement, or the like.

In order to maintain the liquid under pressure, any means such as an expansible sylphon bellows 53 is provided in the expansion chamber, the same having a bottom closure disc 54 secured to a vertical nipple 55 that is extended through an opening 56 in the bottom wall 57 of the chamber. The nipple may be fitted in fluid-tight relation in said opening and locked to the wall 57 as by a nut 58. In this manner the bellows are adapted for communication with the atmosphere.

I have observed that oscillatory vibrations of the bellows may cause disturbances of the liquid 50 and hence of the element 68, hereinafter referred to, and have therefore provided a means such as 51, 52 for communicating the bowl with the expansion chamber, which means is arranged and constructed to prevent the bellows from generating a current in the liquid such as would affect the element. Said means may be arranged in various ways, as according to one illustration presented.

According to the invention the bellows 53 exert sufficient pressure on the liquid 50, so that pressure above atmospheric is maintained even when the liquid has substantially contracted as at temperatures of 32 degrees F., or even at 40 degrees below zero F. The contraction of any suitable liquid from normal temperature as at 65 degrees F. is substantial and may be in the neighborhood of 8 to 10 percent of the volume of the liquid. By exerting such continuous pressure on the liquid, the possibility of evolution of gas or air that may be entrapped in the liquid is substantially overcome. Hence the formation of bubbles in the liquid, which would upset the equilibrium of the compass and interfere with the reading thereof, is eliminated. In order to fill the casing 12 with liquid under a required pressure and assure expulsion of all air therefrom, the bowl 12 and chamber 13 may each have an opening 60 closed by threaded screws or plugs 61, 62. Said openings 60 are desirably located at corners of the bowl and chamber so that upon tipping and filling the casing with liquid, all air bubbles will escape through said openings. Then one of the openings may be closed and additional liquid injected under pressure through the other opening, and the latter finally closed. Or, suction may be applied to the bellows 53 at nipple 55 to contract said bellows, whereupon the casing may be readily filled with liquid through openings 60, and the suction released after the plugs 61, 62 have been applied. In any case, the bellows have sufficient capacity for operation as above stated.

Mounted in central vertically alined relation in the bowl is a standard 63 which may have a base flange 64 secured to the plate 47. At its upper end said standard may have affixed thereto a shell 65 in which is fitted a holder 66 for a jewel bearing 67. The latter may constitute a point support for a rotatable means or element 68 having such an average or mean ratio of its weight in air relative to its weight in liquid that the buoyancy thereof is affected only in minor degree by changes in temperature and hence in density of the liquid 50. More specifically, at the coldest temperature to which the device would be subjected, the density of the liquid would be greatest and consequently the buoyant effect upon the movable element 68 would be a maximum. If now the weight of the element in the liquid is near zero, and yet sufficient to maintain the element in resting engagement with its support or bearing, an ideal condition is attained, since the bearing pressure and friction is then at a minimum and the element will substantially follow the oscillations of the liquid. While this principle is of general application, its particular adaptation to a compass will now be described.

By the damping action of the liquid is meant the tendency of a liquid to eliminate vibrations of the movable element, by causing that coordination of the liquid and element whereby the oscillations of the latter, as under normal conditions, are increased to equal the oscillations of the liquid so that there is substantially no relative movement between the element and the liquid. The term "normal conditions" is used particularly with reference to those frequencies of oscillation which occur in ordinary horizontal flight of an aircraft.

The element 68 may be regarded as magnetically actuated, and the liquid 50 may function not only to reduce the bearing pressure and friction thereof, but also to damp vibrations of the element. Since the liquid 50 wholly fills the casing 11, any vibration or oscillation of the casing, such as occurs in aircraft is fully imparted to the liquid, and by the latter to the element. If the density of the latter were precisely equal to that of the liquid, it is clear that the latter and the casing and element would have an oscillation of the same amplitude. Hence no frictional forces would occur between the element and the liquid, and therefore no deviation in the readings of the instrument due to such frictional forces. This condition I endeavor to attain by sufficiently increasing the buoyancy of the element 68. Satisfactory results are obtained if the ratio of the weight of the element in the liquid to the weight of the element in air is as one to five or six; but for some types of cheaper commercial instruments a ratio of one to four may suffice, while for more accurate instruments, including those for use in warfare, a ratio of one to ten is desirable. If the ratio of the weight of the element in liquid to that in air be high, the pressure on the bearing of the element is correspondingly less and hence the element is more self-centralizing and larger tolerance can be used, but the performance of the compass is in general less satisfactory. If said ratio is greater, the bearing pressure is less and hence the necessary coordination of the parts becomes delicate to maintain the element in its bearing engagement. As the net or mean density of the element approaches the density of the liquid, the element tends to float. To assure that the element is maintained on the bearing requires precision in construction and careful selection of the damping and element materials, constant checking of the materials in course of manufacture, and careful tests of the compass under different temperatures, air pressures, vibratory and other conditions. These factors substantially increase the cost of the compass of the high ratio, but such compass is far more accurate in operation.

The ideal condition, however, is attained, if, in addition to utilizing an element 68 whose density approximates that of the damping liquid, the coefficient of thermal expansion of said element be substantially equal to that of the liquid. In that case the ideal condition is maintained at different temperatures. By my invention such condition may be closely or substantially approximated, and one means whereby the same may be produced will now be described.

The element 68 may include any indicator or pointer 69 adapted to cooperate with the scale 39. Secured to the underside of the latter as at 70 is a leaf spring 71 having adjacent to its ends bowed portions 72. The effective portions of the spring are spaced from the indicator, and a vertical pivot pin 73 is centrally secured to the spring so as to extend downward into engagement with the jewel bearing 67. To prevent accidental removal of the element 68 from the standard 63, a ring 74 may extend around the latter below the shell 65, said ring being of smaller diameter than the shell and having ample clearance therewith. Struts 75 connect said ring with the indicator 69.

While the indicator 69 may itself have the required buoyancy, as by being made of a special material, preferably the element 68 includes an expansible portion filled with any suitable liquid. All solids and especially metals have a very low coefficient of thermal expansion, while that of liquids is many times greater. Hence it will be seen that if the density of the liquid changes with a variation in temperature, the expansible portion correspondingly is expanded by the liquid therein or permitted thereby to contract, as the case may be, to maintain a relatively constant lift on the element 68.

The best results are obtained by utilizing in the element 68 a liquid having a lower specific gravity than the external or damping liquid. If the solid portions of the element 68 have little buoyancy, the internal or rectifying liquid may have a specific gravity of one-half that of the damping liquid, or better still, less than one-half. Thus the damping liquid may consist, for example, of chloroform of 1.48 specific gravity and the rectifying liquid may consist of gasolene of 0.7 specific gravity. The rectifying liquid must of course be such as not to have a high vapor pressure, in other words, it must not readily vaporize under ordinary temperatures of use, including temperatures up to 150° Fahrenheit, a vapor or gas being undesirable because subject to expansion at high altitudes. In every case a rectifying liquid is chosen of a specific gravity consistent with the required lift on the element 68.

According to a simple mode of practising the invention, a closed casing or float 76 may be provided which may have a cylindrical wall 77 and expansible or corrugated side walls 78, hermetically secured thereto. Said float may be completely filled, as under a slight or any suitable pressure, with a rectifying liquid 79, which may be filled thereinto through any sealable port or tube 80. The float may be arranged in vertically coaxial relation with the axis of the element 68 and secured to the indicator 69. A magnetically responsive horizontal member 81 may overlie and be secured to the float casing, for rotatably actuating the element 68. It will be understood that the element 68 constitutes a single balanced and operative unit; and the float 76 may be regarded as adapted for general application wherever constant buoyancy is desired. Since the walls 78 expand in opposite directions, the center of mass is not changed relative to the center of oscillation; and as said walls expand coaxially with the axis of rotation, friction with the damping liquid suffers an immaterial increase. Hence, also, the pendulosity of the magnetic element is relatively constant.

As constructed according to the foregoing principles, the element 68 is so coordinated with the damping liquid in mean density relationship as to have an amplitude of vibration substantially equal to that of the damping liquid, or to be fully responsive to the amplitude of vibration of said liquid or of the bowl 12. The mean density of the element 68 may be approximately equal to that of the damping liquid, but greater than that of the latter so that the element 68 will be maintained in resting relation on its bearing support. However, conditions less desirable than the foregoing may suffice for many of the less sensitive or reliable instruments. Thus a ratio in weight of the element 68 in the liquid 50 to its weight in air of say not greater than one to three and a half may be satisfactory, corresponding to a deviation of say 2 degrees, as for commercial instruments; but a more desirable ratio is one to six, or greater, and superior results may be obtained with a ratio of one to ten or greater. Differently stated, a ratio of amplitude of vibration of the element 68 to that of liquid 50 of at least five to seven may be satisfactory for instruments of ordinary type, while a ratio of at least five to six is better, and substantially high accuracy may be attained by a ratio of at least nine to ten. The foregoing ratios are offered as suggestive approximations. The amplitude of vibration of the element 68 may be determined by placing the compass on a support that vibrates at any desired speed and for any desired amplitude. A radial division line on the compass card will appear to be thicker due to the inability of the eye to follow the rapid vibrations. This increased thickness of the division line can be readily measured with a suitable optical instrument to obtain the difference, if any, between the amplitude of the card and that of the compass bowl. Since the damping liquid does not move relative to the compass bowl, the relation between the amplitude of the element 68 and that of the liquid is thus obtained. The ratio of densities of the element and the liquid largely controls the amplitude ratio, for reasons hereinbefore set forth.

Where formerly in standard compasses, ratios of the weights of the rotary element in liquid and in air were as 1 to 3½, subsequent to and in accordance with the teachings of the present invention, this ratio was increase to 1 to 5, and at present, high grade military compasses employ a ratio of 1 to 7. For military aircraft a ratio higher than 1 to 7 is not at present desired because the period of oscillation of the element is thereby increased, but I believe that this is an unimportant factor and that ultimately a ratio of 1 to 10 will be used.

The liquid filled temperature compensating float is intended to be used primarily in cases where the ratio of the weight of element 68 in the liquid 50 to its weight in air is one to ten or greater. For ratios higher than this, the error produced by temperature changes may be too small as compared with other errors present in a cheaply constructed instrument, to justify the employment of the liquid filled float, and hence the ordinary air filled float may suffice. In this regard, it will be noted that as the error of deviation of the indicator, above referred to, may vary with the speed of the aircraft drive motor, a fixed correction for such deviation is impossible.

It may be stated by way of further definition of the invention that the element 68 has a vibratory movement greater than one half that of the bowl 12 in the same horizontal direction, under vibrations of the same frequency for the element and the bowl; and by reason of the utilization of the spring 71, the bearing action is rendered sufficiently light, even though the weight of the element in the liquid may be one half of its weight in air. Said vibratory movement corresponds to a buoyancy equal to at least one half the weight of the element. The frequency of vibration is determined by subjecting the compass to a vibrating machine that can be set to operate at different frequencies as desired, as hereinbefore described. Such frequencies are preferably employed as occur in an aircraft, and generally according to the motor speed of the aircraft. Since the element 68 is quite light in the liquid, the element tends to move with the liquid as the compass moves along its vibratory path.

It will be noted that by reason of its high buoyancy, the element 68 would be very sensitive to the existence of an air bubble in damping liquid, and hence the importance of maintaining the damping liquid under continuous pressure greater than atmosphere, at different temperatures, to prevent the formation of such bubble.

Moreover, because of the high buoyancy of the element 68, a simple frictionless leaf spring arrangement such as 71 may be used, in place of the heavier and more complicated arrangements heretofore known.

The vibration absorbers 17 reduce oscillation of the casing and hence reduce the relative movement between the damping liquid and the element 68; and the resilient mounting co-operates with the vibration absorbers to cause a reduction of vibrations of the element 68 in all directions, and the benefits of the different resilient mountings being multiplied in effect. In association with each or all of these mountings, the float 76 is particularly effective.

In Figs. 3 and 4 is shown a magnetic compass 82 forming a modification of the invention that embodies the main principles hereinabove described for the device 10, except that a different arrangement is illustrated. The horizontally elongated casing 83 includes a bowl 84 and a lateral expansion chamber 85 separated therefrom by a circular concave wall having an opening 87. Opposite to the chamber 85, the bowl 84 has a lateral opening surrounded by a flange 86 adapted to be closed by a well known bulls-eye lens 87, secured to the flange 86 by a clamping ring 88. Packing 89 may be interposed between a marginal portion of the lens and the members 86, 88. Mounted on an upper portion of the ring 88, in a suitable manner, is an electric bulb 90 having a reflector 91 secured to said ring as at 92, or the bulb may be mounted on the reflector. Since the bulb is disposed at a marginal portion of the lens adequate internal illumination of the bowl is obtained, and the sight through said lens is unobstructed. The bowl 84 and the chamber 85 are both filled with a damping liquid 93, which is continuously maintained at pressures greater than atmospheric, at normal as well as at freezing temperatures, by an expansible bellows 94 disposed in chamber 85 and adapted to communicate with the atmosphere through a mounting nipple 95.

Formed centrally in the bowl 84 is a hub 96 adapted to receive a standard 97 which may be externally threaded into engagement with the hub as at 98. The north seeking element 68a may be suitably vertically mounted on said standard, as by shell 65 secured to the standard and having the holder 66 for the jewel bearing 67, in which the pivot 73 is journaled, and to which the leaf spring 71 may be centrally connected. In place of the indicator 69, a compass card 99 is utilized which may be mounted on the spring 71, said compass card having indicia 100, arranged to be visible through the lens 87. Said compass card may be made sufficiently buoyant as hereinbefore described for 68 and 68a, and may be made of a suitable material for that purpose, and the liquid 93 being of sufficient specific gravity and yet amply fluid within a required range of temperature. However, any suitable float may be utilized, which may, for example, be air filled or evacuated, and expansible or not, as desired, provided the float is so coordinated with the magnetic element as to afford the desired ratios herein stated. In practice, I have found that for ratios of the weight of the element in the liquid to the weight thereof in air, of one-fourth and one-sixth, and even up to approximately one-tenth, satisfactory results may be obtained with an air filled float. Said float, may, however, be partially liquid filled, as with a liquid that vaporizes under ordinary temperatures, to produce varying pressures at corresponding temperatures. Said float may be secured to the upper wall 101 of the compass card and to the spring 71. In order to dispose the magnet 81a nearer to the pivotal point of the element 68a, the magnet may be suitably extended through the float, and in such a manner that the entire element is properly balanced.

A lubber line 102 may be mounted on a bracket 103 having a hub 104 for securing the same to the standard 97. A suitable magnetic compensator 105 may be mounted on top of the bowl 84 in alinement with the axis of the element 68a.

The liquid 93 may be supplied to the bowl 84 and chamber 85 through the respective closures 106 and 107.

Vibration absorber mounting such as shown at 17 may be provided for the device 82, but need not here be shown.

It will be appreciated that various changes and modifications may be made in the device as shown in the drawings, and that the same is submitted in an illustrative and not in a limiting sense, the scope of the invention being defined in the following claims.

I claim:

1. In a compass, the combination with a liquid-damped magnetic sensitive element, of a closed liquid-filled pressure responsive buoyant member for operably supporting said element, whereby a buoyant effect is produced that is substantially constant at different temperatures.

2. In a compass having a magnetically responsive element immersed in a liquid, of means for supporting the element including a closed expansible casing substantially completely filled with a liquid of lesser specific gravity than the first mentioned liquid.

3. In a compass, the combination with a liquid damped magnetic sensitive element, of a hollow expansible float member completely closed and filled with a liquid having a greater coefficient of thermal expansion than the first mentioned liquid, said member being operably attached to said element.

4. A device including in combination with a movable member immersed in a liquid a part of whose weight is carried by a bearing for the member, of a float member for carrying another part of said weight to reduce the friction in said bearing, said float member having a closed expansible casing substantially completely filled with a liquid.

5. In a compass, the combination with a liquid-damped magnetic sensitive element, of a closed liquid-filled pressure-responsive buoyant member engaged therewith for supporting the same, and means enclosing the damping liquid and maintaining the same under continuous pressure above atmospheric at normal and freezing temperatures.

6. In a compass having a liquid filled bowl and a magnetic north-seeking element immersed therein for damping oscillations of the element relative to the liquid, the combination of a liquid filled float for the element for operatively supporting the same, and resilient means for supporting said float and element, as set forth.

7. In a compass, a liquid-damped rotatable magnetic sensitive element, a liquid-filled pressure-responsive buoyant member for operably supporting said element, means for rotatably and tiltably supporting at a single point said element and said member, a casing filled with damping liquid within which said element is immersed, and means maintaining the said liquid under pressure, as set forth.

8. In a compass, a liquid-damped magnetic sensitive element, said element having a closed liquid-filled pressure-responsive buoyant means, means for rotatably, tiltably supporting the element at one point, and said means being expansible and contractible with temperature changes to maintain constant the distance between said point and the center of mass of the element, as set forth.

9. A compass including a liquid-damped magnetic sensitive element adapted to rotate about a vertical axis, a liquid-filled float associated with the element, means for operatively mounting the element and float at a single point, and the float having opposite walls deformable in opposite upright directions under pressure so as to maintain substantially constant the distance between the center of mass and the said point upon expansion or contraction, and so as not to materially affect the damping action on the float, as set forth.

10. A compass having a liquid filled casing, a magnetic sensitive element, resilient means rotatably tiltably mounting said element at a single point in the casing so as to be damped by the liquid, a liquid-filled float for the element, and means for maintaining the damping liquid under pressure.

11. A compass having a casing substantially filled with a damping liquid under pressure so that the liquid is substantially confined against movement relative to the casing, a magnetic sensitive element in the casing whose vibrations both horizontal and vertical are damped by the liquid, means for mounting said element comprising a single pin connected to the element and extending downward therefrom, a jewel for freely tiltably rotatably supporting said pin at the lower end thereof, said element including a single hollow expansible-contractible float and the element having a mean density such that the element substantially floats in the liquid to cause the pin to lightly seat on the jewel, resilient means cooperating with the pin and jewel to freely act in upright and tilted positions of the element and pin for causing the element to be resiliently supported to cause the pin to maintain bearing engagement with the jewel, under vibration, and the float being generally symmetrically coaxial with said pin and having its upper and lower walls movable in opposite upright directions under pressure due to temperature changes so as to maintain substantially constant the distance between the bearing point of the pin and the center of mass of the float, whereby the damping action on the float and the pressure at the bearing are maintained substantially constant with the center of buoyancy maintained above the center of gravity.

12. A compass having a casing substantially filled with a damping liquid under pressure so that the liquid is substantially confined against movement relative to the casing, a magnetic sensitive element in the casing whose vibrations both horizontal and vertical are damped by the liquid, means for mounting said element comprising a single pin connected to the element and extending downward therefrom, a jewel for freely tiltably rotatably supporting said pin at the lower end thereof, said element including a hollow expansible-contractible float, resilient means co-operating with the pin and jewel to freely act in upright and tilted positions of the element and pin for causing the element to be resiliently supported to cause the pin to maintain bearing engagement with the jewel, under vibration, and the float being coaxial with said pin and having its upper and lower walls movable in opposite upright directions under pressure due to temperature changes so as to maintain substantially constant the distance between the bearing point of the pin and the center of mass of the float, whereby the damping action on the float and the pressure at the bearing are maintained substantially constant with the center of buoyancy maintained above the center of gravity.

PAUL KOLLSMAN.